(12) United States Patent
Pettersson

(10) Patent No.: US 7,600,693 B2
(45) Date of Patent: Oct. 13, 2009

(54) INFORMATION CODE INCLUDING REDUNDANT INFORMATION PROVIDING COPY PROTECTION

(75) Inventor: Mats Petter Pettersson, Lund (SE)

(73) Assignee: Anoto AB, Lund (SE)

( * ) Notice: Subject to any disclaimer, the term of this patent is extended or adjusted under 35 U.S.C. 154(b) by 873 days.

(21) Appl. No.: 10/516,592

(22) PCT Filed: Oct. 31, 2003

(86) PCT No.: PCT/SE03/01687

§ 371 (c)(1),
(2), (4) Date: Dec. 3, 2004

(87) PCT Pub. No.: WO2004/057526

PCT Pub. Date: Jul. 8, 2004

(65) Prior Publication Data

US 2005/0173533 A1   Aug. 11, 2005

(30) Foreign Application Priority Data

Dec. 23, 2002   (SE) .................... 0203853

(51) Int. Cl.
G06K 19/06 (2006.01)
(52) U.S. Cl. .................. 235/494; 235/454
(58) Field of Classification Search ............ 235/494, 235/454, 462, 462.1, 462.259
See application file for complete search history.

(56) References Cited

U.S. PATENT DOCUMENTS

| | | | |
|---|---|---|---|
| 5,145,518 A | 9/1992 | Winnik et al. | |
| 5,208,630 A | 5/1993 | Goodbrand et al. | |
| 5,225,900 A | 7/1993 | Wright | |
| 5,256,193 A | 10/1993 | Winnik et al. | |
| 5,271,764 A | 12/1993 | Winnik et al. | |
| 5,286,286 A | 2/1994 | Winnik et al. | |
| 5,291,243 A | 3/1994 | Heckman et al. | |
| 6,208,771 B1 | 3/2001 | Jared et al. | |
| 2003/0066896 A1 | 4/2003 | Pettersson et al. | |
| 2003/0122855 A1 | 7/2003 | Pattersson | |
| 2003/0141375 A1* | 7/2003 | Lawandy ........... | 235/494 |

FOREIGN PATENT DOCUMENTS

| | | |
|---|---|---|
| EP | 0764944 A2 | 3/1997 |
| EP | 0996083 A2 | 4/2000 |
| WO | WO-9950787 | 10/1999 |
| WO | WO-0073983 | 12/2000 |
| WO | WO-0126032 A1 | 4/2001 |
| WO | WO-0126034 | 4/2001 |
| WO | WO-0131576 | 5/2001 |
| WO | WO-0148685 | 7/2001 |

(Continued)

*Primary Examiner*—Seung H Lee
(74) *Attorney, Agent, or Firm*—Birch, Stewart, Kolasch & Birch, LLP

(57) ABSTRACT

In an information code which is arranged to redundantly code at least one first information element by means of a first information element, one or more of the marks can be omitted for the coding of at least one additional information element. In addition, copy protection can be created for an information code that codes at least one first information element by means of a plurality of marks by the addition of at least one interference mark whose optical characteristics differ from those of the marks in the information code. After copying, all the marks will have the same optical characteristics.

42 Claims, 9 Drawing Sheets

FOREIGN PATENT DOCUMENTS

| | | |
|---|---|---|
| WO | WO-0171653 | 9/2001 |
| WO | WO-0175783 | 10/2001 |
| WO | WO-02064380 A1 | 8/2002 |
| WO | WO-02097698 A1 | 12/2002 |
| WO | WO-03042912 | 5/2003 |
| WO | WO-03049023 | 6/2003 |
| WO | WO-03107265 | 12/2003 |

* cited by examiner

INFORMATION CODE INCLUDING REDUNDANT INFORMATION PROVIDING COPY PROTECTION

TECHNICAL FIELD

The present invention relates to a product which is provided with a first information code that is arranged to redundantly code a first information element by means of a plurality of marks. The invention also relates to methods and devices for coding and decoding an information code.

In addition, the invention relates to a product with an information code that cannot be copied while retaining its functionality and a method for producing such a product.

BACKGROUND ART

It is already known that handwriting can be digitised by determining how a pen that is used to produce the handwriting is being moved. One way of carrying this out is to use a base for the handwriting that is provided with a position-coding pattern that codes coordinates for points on the base and also to provide the pen with a sensor that records the position-coding pattern locally at the pen point while the pen is being moved across the base. A processing unit, that can be placed in the pen or remotely from this, can thereafter decode the recorded position-coding pattern, so that the movement of the pen across the base can be determined as a series of coordinates.

In WO 01/26032, which has been assigned to the same Applicant as the Applicant for the present application, a position-coding pattern is described that can be used for digitising handwriting. The pattern is constructed of marks, which for example can be in the form of dots. Each dot has a nominal position, which can consist of an intersection between two lines in a virtual raster, for example a square grid. Each dot codes a particular value dependent upon its placing in relation to the nominal position. The dots can, for example, have four possible placings, one on each of the four raster lines that emanate from the intersection, with the four different placings coding four different values. The coordinates for a point are coded using a plurality of dots, for example 6*6 dots. Each dot contributes, however, to the coding of the coordinates for several points. If a sensor first reads 6*6 dots and thereafter is moved to the side or vertically by the distance of one dot, the sensor will read dots that code the coordinates for a new point. Each set of 6*6 dots thus defines a position in the total position-coding pattern. In this application, this type of pattern is called "floating".

Using the position-coding pattern in the above-mentioned WO 01/26032, coordinates can be coded for a very large number of points, theoretically 4$^{36}$ points if each point is coded by 6*6 dots. All these points can be said to form an imaginary surface or constitute points in a coordinate system.

WO 01/71653, which has been assigned to the same Applicant as the Applicant for the present application, describes how the position-coding pattern described in WO 01/26032 can be used instead for general information coding.

WO 01/48685, which has also been assigned to the same Applicant as the Applicant for the present application, describes how the position-coding pattern in WO 01/26032 can be used to control the processing of the digital information that is recorded by means of the position-coding pattern. More specifically, the processing unit that decodes the position-coding pattern can store different digital templates, that define how information that is recorded from different parts of the position-coding pattern is to be interpreted. An e-mail template can, for example, specify that information, that is pairs of coordinates, recorded from a first field in the position-coding pattern on a base constitutes message information, that information recorded from a second field constitutes an e-mail address and is to be interpreted by ICR (ICR=Intelligent Character Recognition), and that information recorded from a third field is to be regarded as an instruction to send the message information originating from the first field to the e-mail address determined from the second field. The digital template thus comprises a description of which coordinate areas correspond to which fields. The processing unit utilizes this description in order to determine how decoded pairs of coordinates are to be processed.

In addition, WO 01/48685 describes how the position-coding pattern can be divided into pages and how the same digital template that is in the processing unit can be used for several pages in the position-coding pattern.

In order to make possible flexible information processing, different parties may want to have bases with different functions associated with different fields, with different numbers of fields, with differently placed fields and with differently sized fields. For this purpose, the processing unit may need to store a large number of different digital templates, which in addition may need to be updated and supplemented, as different parties want to create new bases.

This can constitute a problem, particularly if the processing unit has limited memory capacity and/or if it is time-consuming to amend, supplement and/or update the digital templates once these have been stored in the processing unit. This can, for example, be the case if the processing unit is in a portable user unit, such as the pen in WO 01/48685.

In the Swedish patent application SE 0103029-5, which was filed on 13 Sep. 2001 by the same Applicant as the Applicant for the present application and which was thus not available to the public at the time of filing SE 023853-7, from which the present application claims priority, a solution is proposed to the problem of the need to store a multitude of digital templates. More specifically, use is proposed of a coding pattern that comprises a plurality of marks, the position information being coded by a variation in a first parameter of the marks and additional information being coded by a variation in a second parameter of the marks. The additional information can be used for indicating or marking out fields of the type described above in the coding pattern on the physical base. Instead of the information about the different fields being in digital templates, it can thus be coded directly in the coding pattern, with the result that in principle any layouts for information processing can be achieved on physical bases and that the processing unit needs to store considerably less information than in the case with digital templates.

The additional information can alternatively be used to indicate in the coding pattern on the physical base whether a particular field in a digital template with several alternative fields is activated or not. By digital templates being combined so that in each digital template there is a description of a large number of alternatively useable fields and by the fields used in each individual case being activated by means of the coding of additional information in the coding pattern on the physical base, the number of digital templates required can be reduced.

The indication or activation of fields is achieved by the coding pattern in the different fields being divided into cells, each of which comprises a plurality of marks, and by each of the cells being allocated a predetermined value by means of the variation in the second parameter.

In the Swedish patent application SE 0201846-3, which was filed on 18 Jun. 2002 by the same Applicant as the Applicant for the present application and which was thus not available to the public at the time of filing SE 0203853-7, from which the present application claims priority, an alternative solution is described to the problem of the need to store a multitude of digital templates. More specifically, it is proposed in this application that the fields are indicated by means of a second position-coding pattern, which can be coded using a second parameter of the dots that are comprised in the first position-coding pattern. The second position-coding pattern codes coordinates in a second coordinate system which is different from the first coordinate system in which the first position-coding pattern codes coordinates. The second coordinate system is divided into partial areas with different associated functions. Thus in this case the processing unit only needs to store a description of the division of the second coordinate system into partial areas in order to be able to control the processing of the information that is recorded by means of the first position-coding pattern.

Another problem with the coding pattern described above and other similar coding patterns is that a base that is provided with this pattern can be copied while retaining its functionality. This property is undesirable for the party that is selling bases with the coding pattern. There is therefore a need to provide the base with coding patterns that are copy protected.

SUMMARY OF THE INVENTION

A first object of the present invention is to propose a solution to the problem described above, namely that many digital templates are required to make possible flexible information processing.

The invention relates among other things to a product that is provided with a first information code, which is arranged to redundantly code at least one first information element using a plurality of marks. At least one additional information element is coded on the product by at least one of said plurality of marks being omitted on the product.

The invention relates among other things to a product that is provided with a first information code, which is arranged to redundantly code at least one first information element using a plurality of marks. At least one additional information element is coded on the product by at least one of said plurality of marks being omitted on the product.

As there is a redundancy in the first information code, it is possible to decode the first information element even if one or more marks are missing. This property is utilized in the invention in such a way that at least one mark is intentionally omitted with the aim of coding at least one additional information element.

The additional information element or elements can, for example, be utilized to indicate or activate fields on a base that is provided with a position-coding pattern for digital recording of handwriting.

A second object of the present invention is to propose a solution to the problem of copying.

The invention relates, in addition, among other things to a product that is provided with an information code that codes at least one first information element by means of a plurality of marks, the product being characterized by it being provided, in addition, with at least one interference mark that has optical characteristics that are different from those of said plurality of marks.

The invention relates, in addition, among other things to a product that is provided with an information code that codes at least one first information element by means of a plurality of marks, the product being characterized by it being provided, in addition, with at least one interference mark that has optical characteristics that are different from those of said plurality of marks.

By allocating the interference mark suitable optical characteristics that differ from those of the ordinary information marks, it is possible to ensure that the interference mark is not detected by the decoding device that is used for decoding the information code. Alternatively, it can be ensured that the decoding device can distinguish the ordinary information marks from the interference mark so that it can disregard the interference mark during the decoding. Accordingly, the interference mark will not interfere with the decoding of the information code on the original product. However, if the product is copied, all the marks will, of course, have the same optical characteristics and the interference mark will thereby also be detected by the decoding device. If the interference mark is suitably placed and/or designed, it can interfere with the decoding device so that this cannot decode the information code on a copied product, whereby copy protection is thus obtained.

BRIEF DESCRIPTION OF THE DRAWINGS

In the following, the present invention will be described in greater detail by way of examples, with reference to the accompanying drawings, in which.

DETAILED DESCRIPTION OF EXAMPLES

In the following, an example of a known information code in which the present invention can be utilised is first described with reference to FIGS. 1 and 2. There follows a description with reference to FIGS. 3-10 of how additional information can be coded in this information code by the omission of marks in the code. Finally, there is a description with reference to FIG. 11 of how the information code can be protected from copying by the omission of marks in the code and the addition of interference marks.

Figure 1:
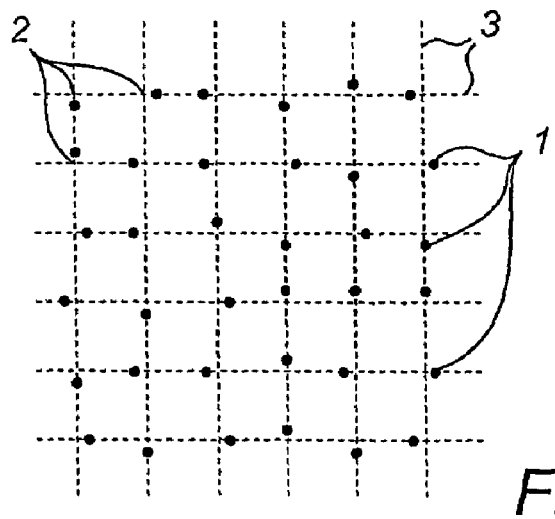
FIG. 1 shows schematically a known first information code.

FIG. 1 shows an example of an information code in the form of a position-coding pattern of the type that is described in WO 01/26032 that was mentioned by way of introduction. The position-coding pattern is constructed of marks 1, which here are the shape of circular dots. Each mark is displaced in any one of four different directions in relation to a reference position or nominal position 2, which consists of an intersection between raster lines 3 in a raster. The raster can be invisible, but in FIG. 1 the raster is shown by broken lines for the sake of clarity.

Each mark 1 represents a value 0-3 depending upon in which direction the mark is displaced in relation to the nominal point 2. The value 0 is coded by displacement to the right, 1 by displacement upwards, 2 by displacement to the left and 3 by displacement downwards. The different possible values 0-3 for the marks can be expressed in binary form as bit pairs (0,1; 0,0: 1,0; and 1,1). The first bit in the bit pair corresponding to a mark's value is used for coding position information in the x-direction and the second bit is used for coding position information in the y-direction. The position coding is thus carried out separately in the x-direction and the y-direction, but the graphical coding is carried out using marks that are the same for the x-direction and the y-direction.

Figures 2A, 2B:
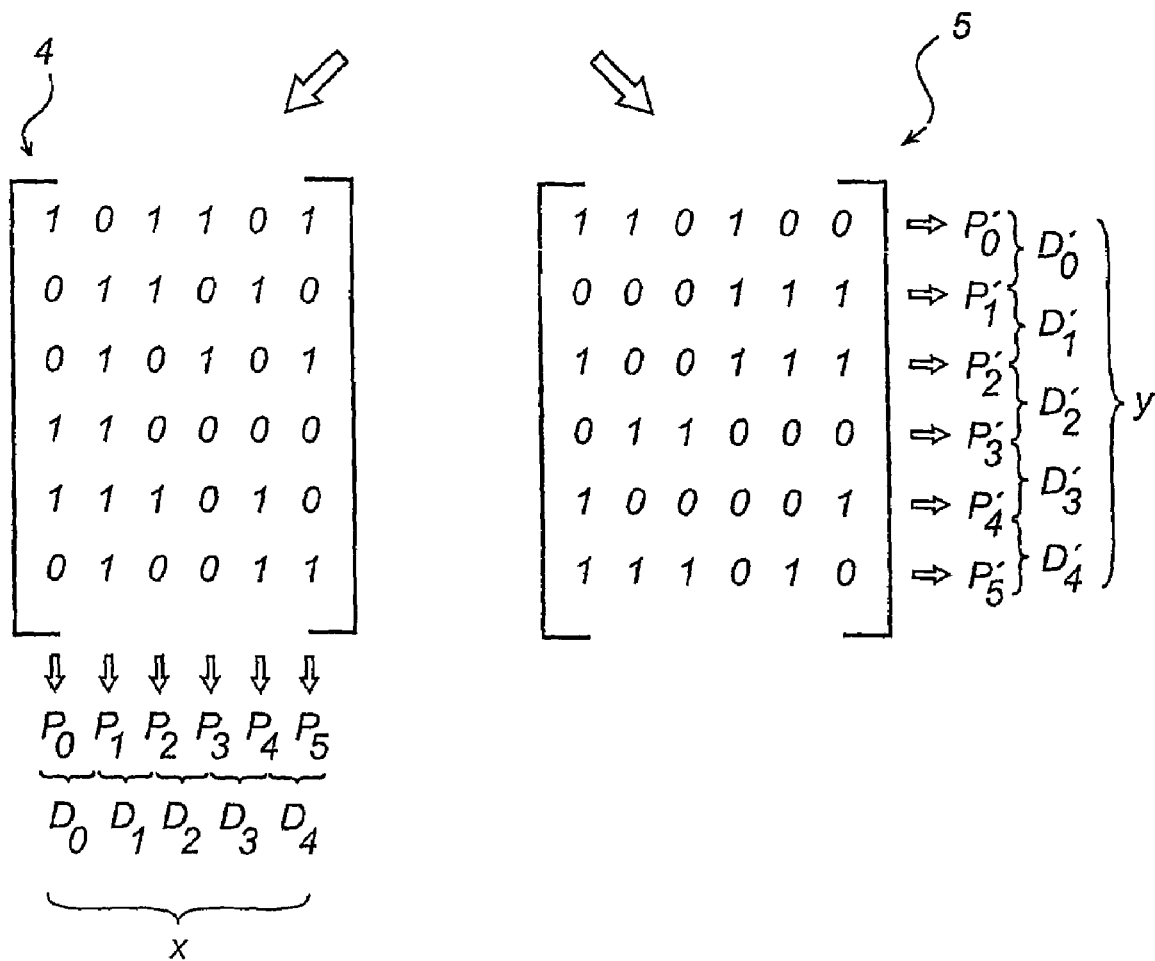
FIGS. 2a and 2b show the first information code decoded into a bit matrix that codes an x-coordinate and a bit matrix that codes a y-coordinate.

Each set of 6*6 adjacent marks in the position-coding pattern codes a position in the form of an x-coordinate and a y-coordinate. More specifically, each set of 6*6 marks can be translated into a 6*6-bit matrix that codes an x-coordinate and a 6*6-bit matrix that codes a y-coordinate for the position. FIGS. 2*a* and 2*b* show an x-bit matrix 4 and a y-bit matrix 5 that were decoded from the information code in FIG. 1.

In addition, consider the x-bit matrix 4. This can be divided into six columns, each with six bits. Each sequence of bits in a column constitutes a partial sequence in a 63 bit long cyclic main number sequence that has the property that if a partial sequence is extracted that is six bits in length, this has an unambiguously determined location in the main number sequence. The six columns can thus be translated into six position numbers P0-P5, that correspond to six locations in the main number sequence. Between these six position numbers, five difference numbers D0-D4 can be created in pairs, which code the x-coordinate. For a certain x-coordinate, the position numbers P will vary depending upon the y-coordinate. The difference numbers D are, on the other hand, the same regardless of the y-coordinate, as the position numbers P always vary in accordance with the main number sequence that is repeated cyclically in the columns in the total position-coding pattern.

In a corresponding way, six rows in the y-bit matrix define six position numbers P'0-P'5 in the main number sequence. These six position numbers define five difference numbers D'0-D'4, that code the y-coordinate.

The difference numbers D and D' can, for example, code the x-coordinate and the y-coordinate respectively by constituting a partial sequence of an x-difference number sequence and a y-difference number sequence respectively, each of which has the property that a partial sequence consisting of five numbers has an unambiguously determined location in the difference number sequence. Another principle for how the difference numbers D and D' code the x-coordinate and the y-coordinate respectively is described in the above-mentioned WO 01/26032.

Even though in principle no more than 6*6 marks are required for defining a position, 8*8 marks are used advantageously for the decoding. The fact is that the above-mentioned 63 bit long main number sequence can be designed in such a way that none of the 8 bit long partial sequences that are included in the main number sequence occurs backwards and inverted or with one bit inverted in the main number sequence. This property of the main number sequence can be used to determine how a recorded image of the position-coding pattern, which, after all, looks essentially identical whether it is rotated through 0, 90, 180 or 270 degrees, is oriented. In addition, it can be used to correct an incorrectly decoded bit in an eight-bit long column or row in the x- or y-bit matrix 4, 5.

With decoding using 8*8 marks, the position-coding pattern thus contains redundant information, which means that it is possible to decode positions correctly even though one or more marks are in an incorrect position in the position-coding pattern, are missing in the position-coding pattern, are decoded incorrectly or are missed during the decoding. This property can in turn be utilized for coding additional information in the position-coding pattern.

As mentioned above, the position-coding pattern comprises a plurality of nominal positions 2 that consist of intersections between raster lines 3 in a raster. In this example, these nominal positions 2 with associated marks 1 code position information, but can also, as has been described above, code other information. Therefore in the following the term "first information code" is used instead of position-coding pattern.

Thanks to the redundancy in the first information code, marks that belong to certain of the nominal positions can be omitted while retaining the ability to decode the first information code. All the marks can, of course, not be omitted, only a subset or a selection of these. The number of marks that can be omitted and for which nominal positions are determined by the error-correcting properties of the first information code. The subset of the first information code's nominal positions for which marks can be omitted constitutes a basis for a second information code for coding additional information in addition to that which is coded by the first information code. In the following the combination of the first information code and the second information code is called just the information code.

Figure 3A:
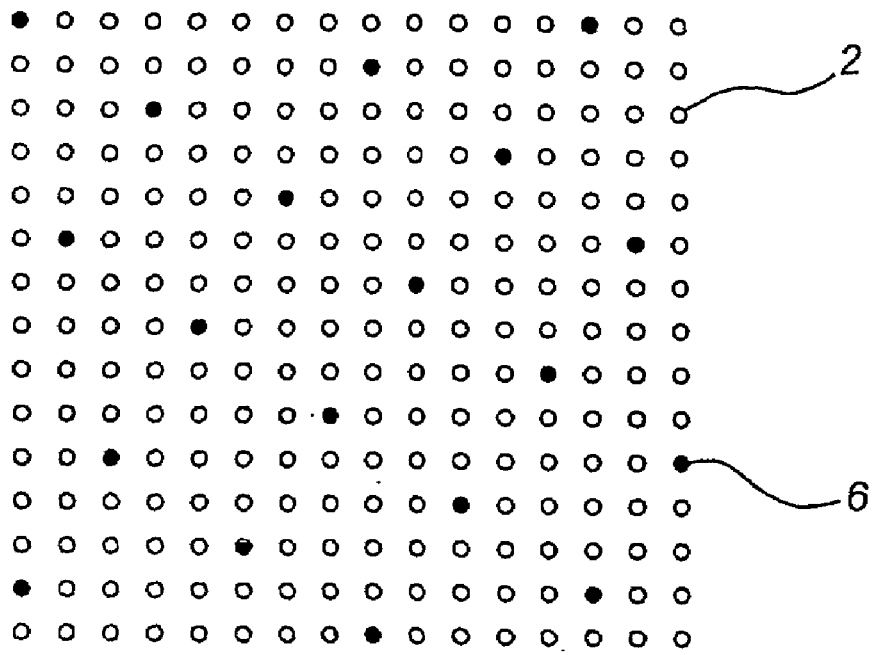
FIGS. 3a and 3b show schematically two examples of patterns in accordance with which marks can be omitted in the first information code shown in FIG. 1 without the decodability thereof being lost.
Figure 3B:
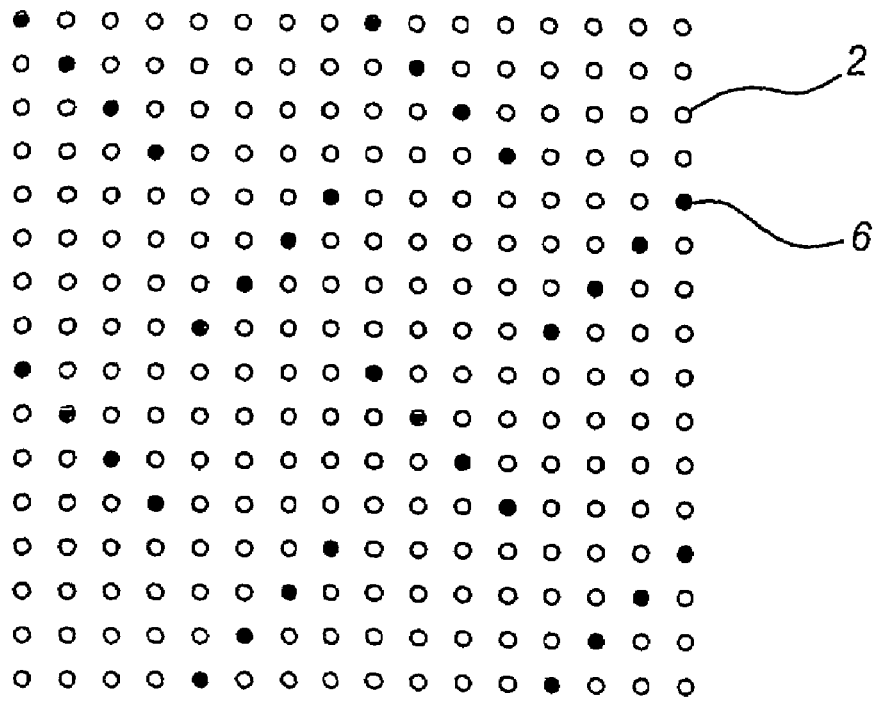

FIGS. 3*a* and 3*b* show two different examples of which nominal positions 2 in the first information code can have their associated mark omitted while retaining the ability to decode the first information code. The nominal positions 2 that belong to the first information code are marked by circles, which can be filled in or not, while the nominal positions 6 that belong to the second information code are marked by filled-in circles.

In the example in FIG. 3*a*, at least four marks can thus be omitted in each set of 8*8 marks, while in the example in FIG. 3*b* eight marks can be omitted in each set of 8*8 marks. In neither case is more than one mark of eight consecutive marks in a row or a column omitted as the error-correcting properties of the first information code are such that a maximum of one bit error in eight bits can be corrected.

It should be pointed out that the examples in FIGS. 3*a* and 3*b* are just examples. With a first information code with the error-correcting properties described above, it is possible to remove marks in other arrangements or patterns than those that are shown in FIGS. 3*a* and 3*b*. If a first information code with other error-correcting properties is taken as a starting point, marks can, of course, be removed in other arrangements or patterns.

The second information code can code the additional information in various ways.

A commonplace way is to either retain or omit marks for all nominal positions 6 in the second information code. In this way, two different information values can be coded.

Another way is to omit marks in any one of a plurality of predetermined patterns or arrangements for omitting marks in the second information code. The information is then coded dependent upon which of this plurality of predetermined patterns is used. Examples of predetermined patterns can be those that are shown in FIGS. 3a and 3b. Other examples can be based on those in FIGS. 3a and 3b, but where the choice is made to retain the marks in certain nominal positions, for example in half of the nominal positions in a regular pattern.

Figure 4:
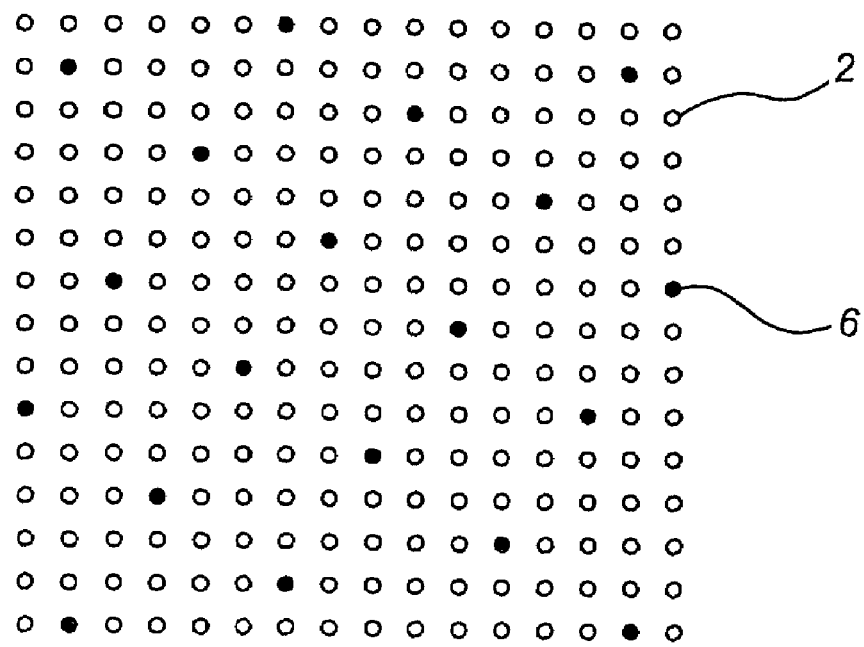
FIG. 4 shows the same pattern as in FIG. 3a for omitting marks, but the pattern is displaced in another way in relation to the first information code.

An additional way is to omit all marks according to any one of the possible patterns for omitting marks and to code information dependent upon the relative placings of the first information code and the second information code. More specifically, the first omitted mark in the second information code and thereby all the second information code can be placed differently in relation to the origin of the first information code. This is illustrated in FIG. 3a and FIG. 4 that show two different possible relative placings of the first information code and the second information code.

Figure 5A:
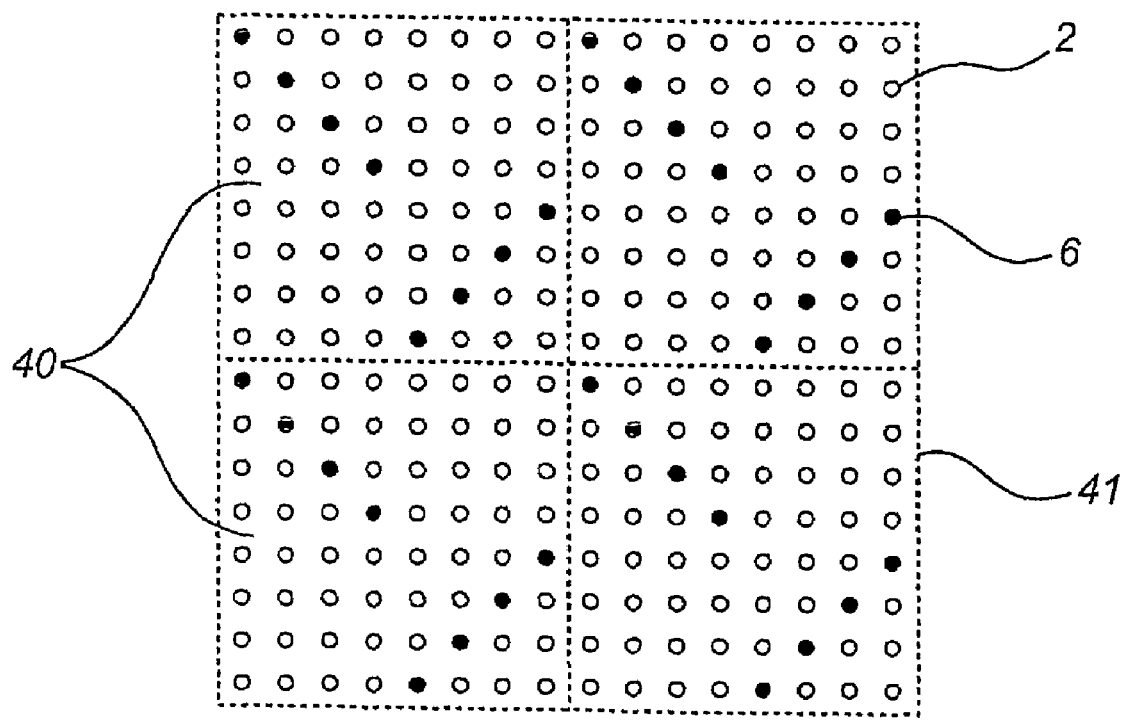
FIGS. 5a and 5b show how the information code in FIGS. 3b and 3a respectively can be divided into cells.

Yet another way is to divide the first information code into cells, and let information be coded by the absence and presence of marks in the cells in the nominal positions that belong to the second information code. FIG. 5a shows more specifically how the first information code can be divided into fixed cells 40 that are 8*8 marks in size. The cells are normally not marked on the base on which the first information code has been applied, but are virtual cells. For the sake of clarity, however, they are marked in FIG. 5a by broken lines 41.

FIG. 5a shows, in addition, the nominal positions 6 that constitute part of the second information code. These nominal positions 6 form a pattern according to FIG. 3b. Within each cell 40 there are eight nominal positions that constitute part of the second information code. If each such nominal position codes the value 0 or 1 depending upon whether the mark is present or has been omitted, each cell can code 28 different values, that is 256 different values.

Cells of a different size and shape can be used. In FIG. 5a, for example, cells can be used with 4*8 nominal positions in the first information code, each of which then contains four nominal positions in the second information code, which can thus code $2^4$ different values.

Figure 5B:
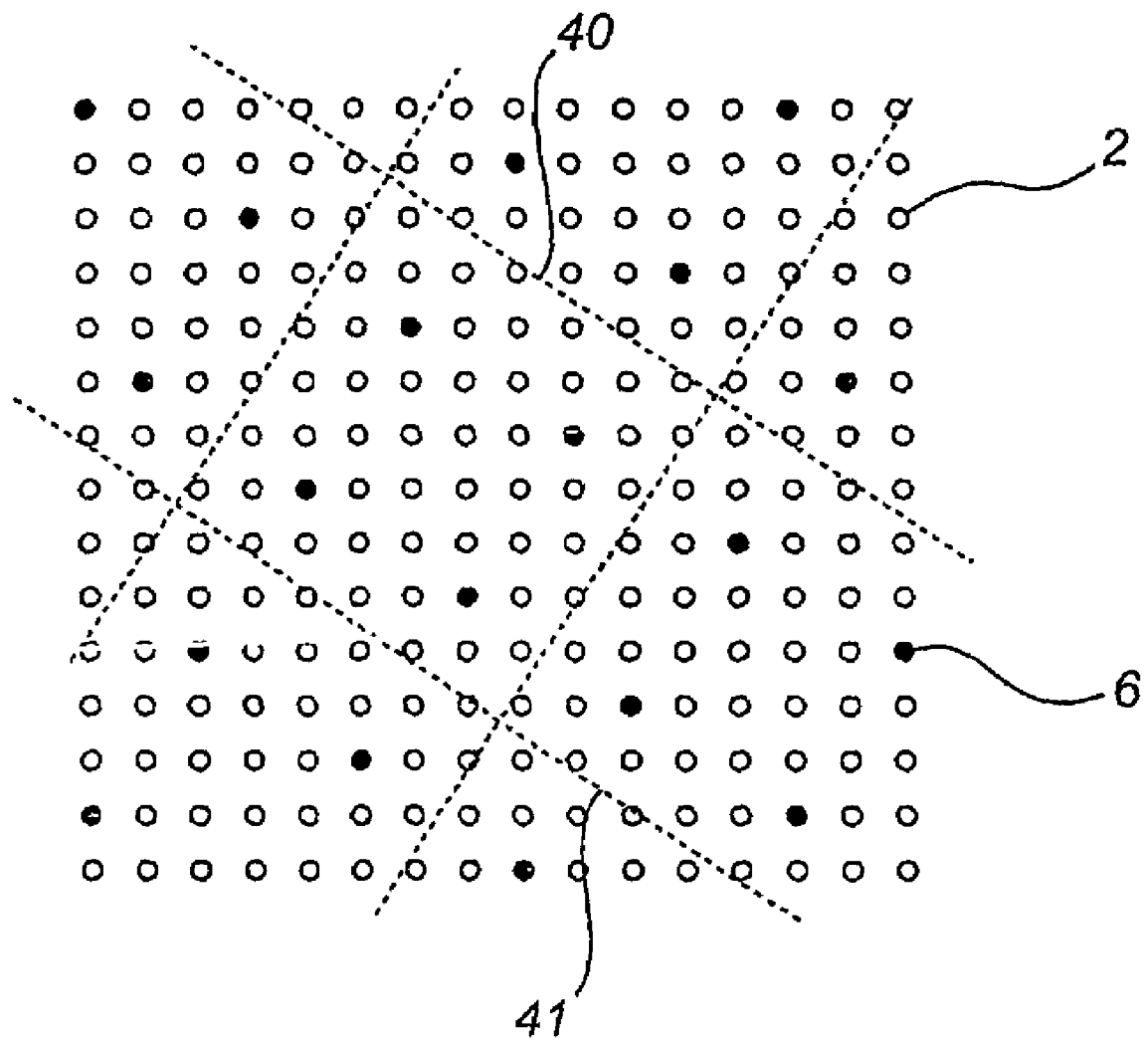

FIG. 5b shows yet another example of division into cells 40. This example is based on FIG. 3a. In this example, the cells are rotated in relation to the raster for the first information code. In addition, each cell contains four nominal positions 6 which belong to the second information code. Each cell can thus code a maximum of $2^4$ different values, that is 16 different values.

As shown in FIG. 5a, the cells do not overlap each other, but are fixed in relation to the first information code, which means that their placings are simple to determine as soon as the first information code has been decoded. In this case, it is assumed, however, that the first information code codes position information.

In the case shown in FIG. 5b, the placings of the cells are determined by at least one omitted dot being identified. On the basis of this dot, the nominal positions 6 that form the basis for the second information code can be identified since their relative placing in the first information code is known. In addition, the coordinates that are defined for the nominal position associated with the omitted mark can be determined. As has been described above, the coordinates for a position are coded by the marks that belong to each set of 8*8 nominal positions in the first information code. These coordinates relate to the nominal position at the top left in the set. The coordinates for the nominal position 6 or the position of the nominal position 6 that is associated with the omitted mark can thus be determined. As the rotation of the cells and their placing in relation to the first information code is known, the cells 40 can be defined in any part of the information code, when an omitted mark has been identified and the coordinates for this omitted mark have been determined.

The decoding of the first information code is based on 8*8 marks to make possible error correcting. If a decoding device records an image of the information code that does not comprise more than precisely 8*8 marks, it is not certain that the marks recorded in the image comprise a whole fixed cell for decoding the second information code. If all or most of the cells code the same value, this constitutes no problem, however, as the decoding can then be carried out on the basis of parts of several adjacent cells in the image.

If the decoding device records an image with at least 15*15 marks, a whole cell will always be included within the recorded marks. In addition, a cell value can be determined if required, using information from several images recorded by a decoding device.

The second information code can code different types of information. It can be used for superimposing a second information layer on the first information layer coded by the first information code. The second information layer can, for example, contain height information which is related to positions on a map, which positions are coded by means of the first information code.

In addition, the second information code can be used to indicate or activate different fields with different functions on a physical base which is provided with a first information code. The indication and/or activation can be carried out in a corresponding way to that described in SE 0103029-5 and SE 0201846-3 mentioned by way of introduction.

Figure 6:
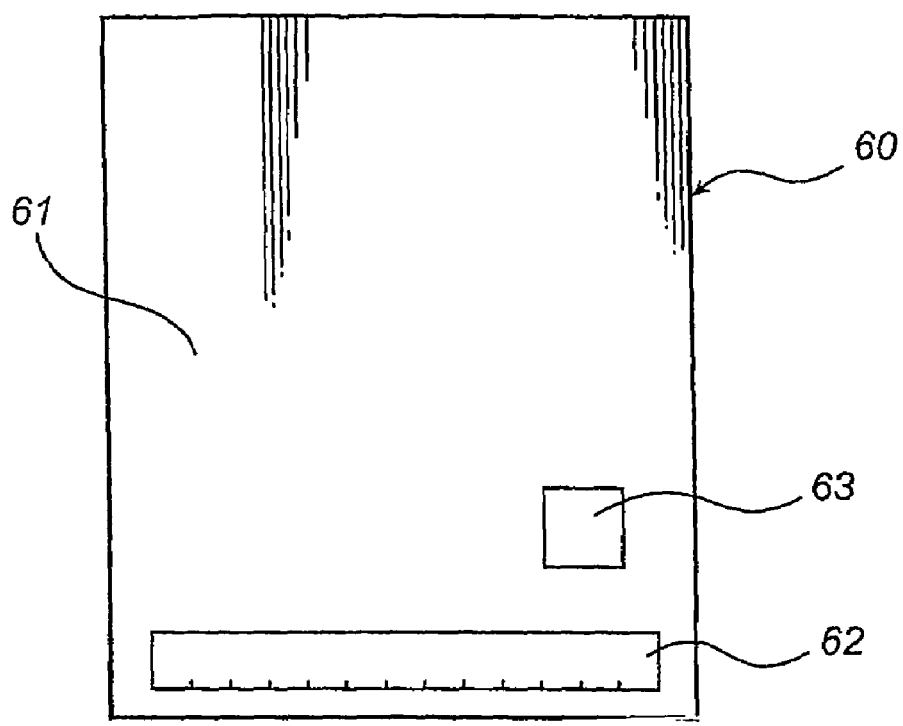
FIG. 6 shows a form in which different fields can be indicated by the omission of marks.

FIG. 6 shows schematically an e-mail form 60 which is divided into three different fields with different functions. A first field 61 is intended for message information that is to be recorded and processed only as a sequence of coordinates. A second field 62 is intended for address information that is to be interpreted using ICR (Intelligent Character Recognition). A third field 63 constitutes a so-called send box that indicates that one or more coordinates that are recorded from this area are to be interpreted as an instruction that message information recorded from the first field is to be sent to the address recorded from the second area.

The whole e-mail form 60 is provided with the first information code. The three different fields can be distinguished by means of the second information code, in a corresponding way to that described in the above-mentioned SE 0103029-5. For example, the second information code can be divided into cells that code different values in the three different fields or the pattern of omitted marks can be displaced in different ways relative to the first information code in the three fields. In this example, the whole e-mail form 60 is thus divided into fields, which are provided with the second information code, which accordingly extends over the whole e-mail form. According to another alternative, the send box 63 and address field 62 can be defined as fields that are indicated by means of the second information code, while the remaining part 61 of the form is regarded as a background where no marks are omitted and where accordingly only the first information code is to be found.

As yet another example, the second information code can be position coding in a corresponding way to that described in SE 0201846-3. The first information code is then suitably divided into cells, each of which codes four different values. The position coding can then be carried out in the way that is described in the above-mentioned WO 01/26032, whereby the cells with their four different possible values correspond to the marks in WO 01/26032. The second information code then codes coordinates for points in a second coordinate system or on a second imaginary surface so that the position information can be separated from the position information that is coded by the first information code. The number of cells that code coordinates for a point in the second coordinate system can be considerably less than the number of marks in the first information code that code coordinates for a point. Using a position-coding second information code that is used for indicating a field on a physical base, the so-called pen point displacement problem can be solved. In a pen that has a pen point that is used to make pen strokes on a physical base with an information code and a sensor that is used to record the information code, the pen point and the sensor can be displaced in relation to each other. It can then occur that the user points with the pen point in one field with a particular function, but that the sensor, due to the displacement, records the information code in another field. If the second information code is position coding and extends outside the actual field, the decoding device can determine where the pen point is located and whether it is inside or outside the actual field.

The information code described above can be applied on a physical base or product. It can, for example, be printed out on a sheet of paper.

Figure 7:
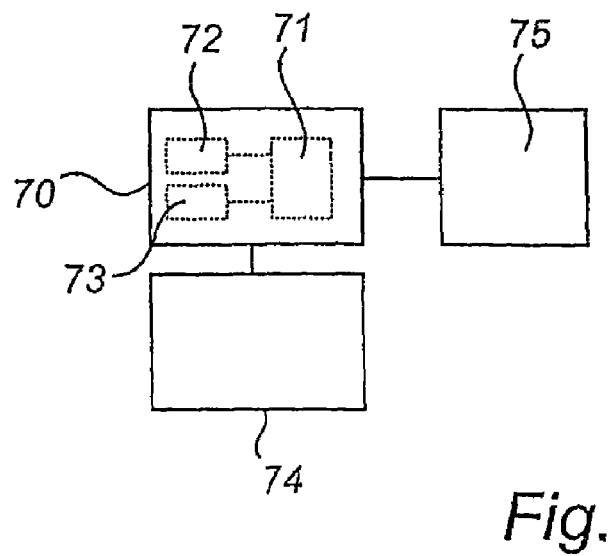
FIG. 7 is a schematic block diagram for a coding device for coding an information code.

Now follows a description of how the coding of the information code can be carried out in a coding device, which is illustrated schematically in FIG. 7. The coding device, which for example can be realized by means of an ordinary personal computer, comprises a processing unit 70 which in addition to the actual processor 71 comprises a working memory 72 and a program memory 73 which stores a program for producing the information code. The coding device comprises, in addition, an input means 74 which makes it possible for a user to input information into the processor concerning a required layout for the information code on a physical base. The input means 74 can, for example, be a keyboard or a mouse or some other corresponding input unit that is normally used together with a computer. In addition, a unit 75 can be connected to the coding device which, on the basis of a digital representation of an information code, applies a graphical representation of the information code on a product. The unit can, for example, consist of a printer that prints out the information code on a sheet of paper or alternatively be some form of printing device.

Figure 8:
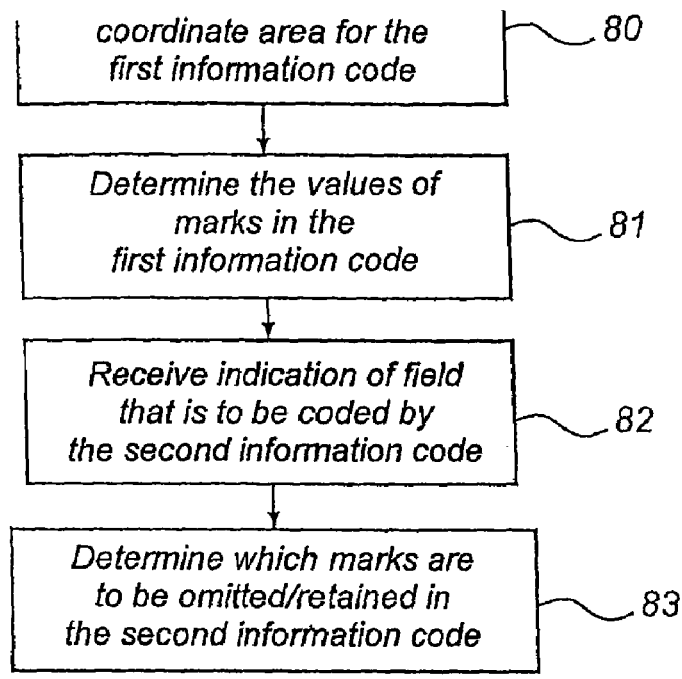
FIG. 8 is a flow chart that shows how an information code can be coded.

With reference to the flow chart in FIG. 8, there now follows a description of how the coding can be carried out in the case when the additional information is coded by the first information code being divided into cells and by these being allocated values for indication of different fields.

In a first step 80, the processor 71 in the coding device receives an indication entered by the user of which coordinate area is to be coded by the first information code. The indication can consist of a selection from predefined coordinate areas or an explicit indication of an area in the form of, for example, a pair of coordinates defining the top left corner of the area and a width and a height on the page. In association with this step, space is allocated in the working memory 72 for storage of a digital representation of the information code. For each mark that is included in the information code, the processor thereafter calculates a value that indicates the placing of the mark, in step 81. How such a calculation can be carried out is described in the above-mentioned WO 01/26032. The value of the respective mark is stored in a first matrix in the working memory 72. The value can, for example, be given as a number between 0 and 3, where 0 means that the mark is displaced to the right from its nominal position, 1 that it is displaced upwards, 2 that it is displaced to the left and 3 that it is displaced downwards.

After this the processor 71 receives an indication of at least one field of a certain type that is to be indicated by means of the second information code and the placing of this field within the coordinate area that is coded by the first information code, step 82.

On the basis of the indication in step 82, the processor determines a second matrix that defines the cell values for the indicated field or fields. The indicated fields can, as has been described above, cover all or a part of the coordinate area that is to be coded by the first information code. The second matrix constitutes the input signal to the next step in the coding. In the following step, the processor 71 determines, on the basis of the cell values defined in the second matrix and in accordance with a predetermined algorithm that states how the cell values are coded, whether each of the marks that correspond to nominal positions in the second information code is to remain in the information code or is to be omitted, step 83. More specifically, the processor determines a third matrix that is the same size as the first matrix, in which it allocates the marks that are to be omitted the value 4 and the other marks the value 0.

Finally, a fourth matrix is created as the sum of the first matrix and the third matrix. Marks that are to be found in the information code have a value in the fourth matrix that codes their placing. Marks that are to be omitted have a value that is 4 or higher.

When the coding is completed, the information code can be printed out if so required, using the printer 75. The fourth matrix can, for example, be sent to a program that generates a PostScript file for printout on the printer.

Figure 9:
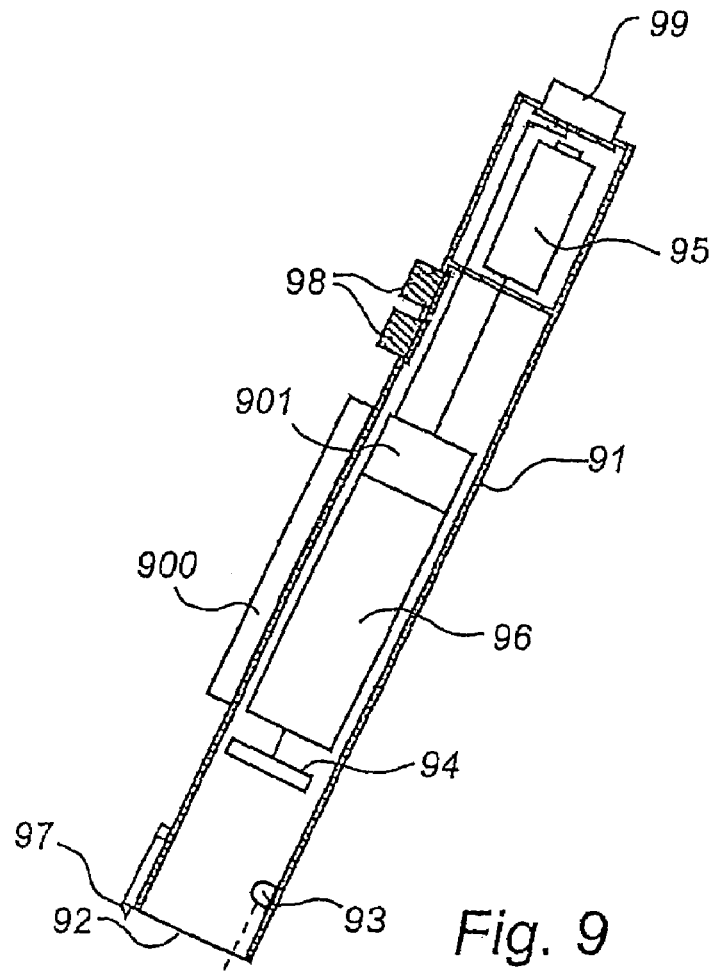
FIG. 9 shows schematically a user unit that can be used for decoding an information code.

FIG. 9 shows an example of how a hand-held user unit which can be used as a decoding device, can be realized. It comprises a casing 91 which is approximately the same shape as a pen. In the end of the casing there is an opening 92. The end is intended to abut against or to be held a short distance from the surface from which the position-coding pattern is to be recorded.

The casing contains principally an optics part, an electronic circuitry part and a power supply.

The optics part comprises at least one light-emitting diode 93 for illuminating a partial area of the surface with the information code and a light-sensitive area sensor 94, for example a CCD or CMOS sensor, for recording a two-dimensional image of the information code on the surface. If required, the device can also contain an optical system, such as a mirror and/or lens system. The light-emitting diode can be an infrared light-emitting diode and the sensor can be sensitive to infrared light.

The power supply for the device is obtained from a battery 95, which is mounted in a separate compartment in the casing. It is also possible to provide the power supply via a cable from an external power source (not shown).

The electronic circuitry part contains a processing unit 96 with a processor which is programmed to record images from the sensor 94 and to decode the information code in these images, plus a working memory and a program memory. In addition, the processor can be programmed to carry out certain operations on the basis of the decoded information. The processor can, for example, send information to a specific address that is included in the decoded information, as a result of it interpreting and processing the decoded information.

For this purpose, information is stored in the user unit which makes it possible for this to determine how the decoded information is to be processed/interpreted. The information can, for example, include which fields are coded by which cell values and/or by which displacements of the second information code relative to the first information code and/or by which specific patterns of omitted marks.

In this embodiment, the user unit also comprises a pen point 97, with the aid of which the user can write ordinary pigment-based writing on a base from which the coding pattern is to be recorded. The pen point 97 is extendable and retractable so that the user can control whether or not it is to be used. In certain applications, the user unit does not need to have a pen point at all.

The pigment-based writing is suitably of a type that is transparent, that is non-absorbent, to infrared light and the marks suitably absorb infrared light. By using a light-emitting diode which emits infrared light and a sensor which is sensitive to infrared light, the detection of the pattern can be carried out without the above-mentioned writing interfering with the pattern.

The user unit can also comprise buttons 98, by means of which the device can be activated and controlled. It also has a transceiver 99 for wireless transmission of information to and from the device, for example using infrared light, radio waves or ultrasound. The user unit 2 can also comprise a display 900 for displaying recorded and/or processed information.

The user unit can be divided between different physical casings, with a first casing containing components which are required for recording images of the coding pattern and for transmitting these to components which are contained in a second casing and which decode the coding pattern in the recorded image or images.

Figure 10:
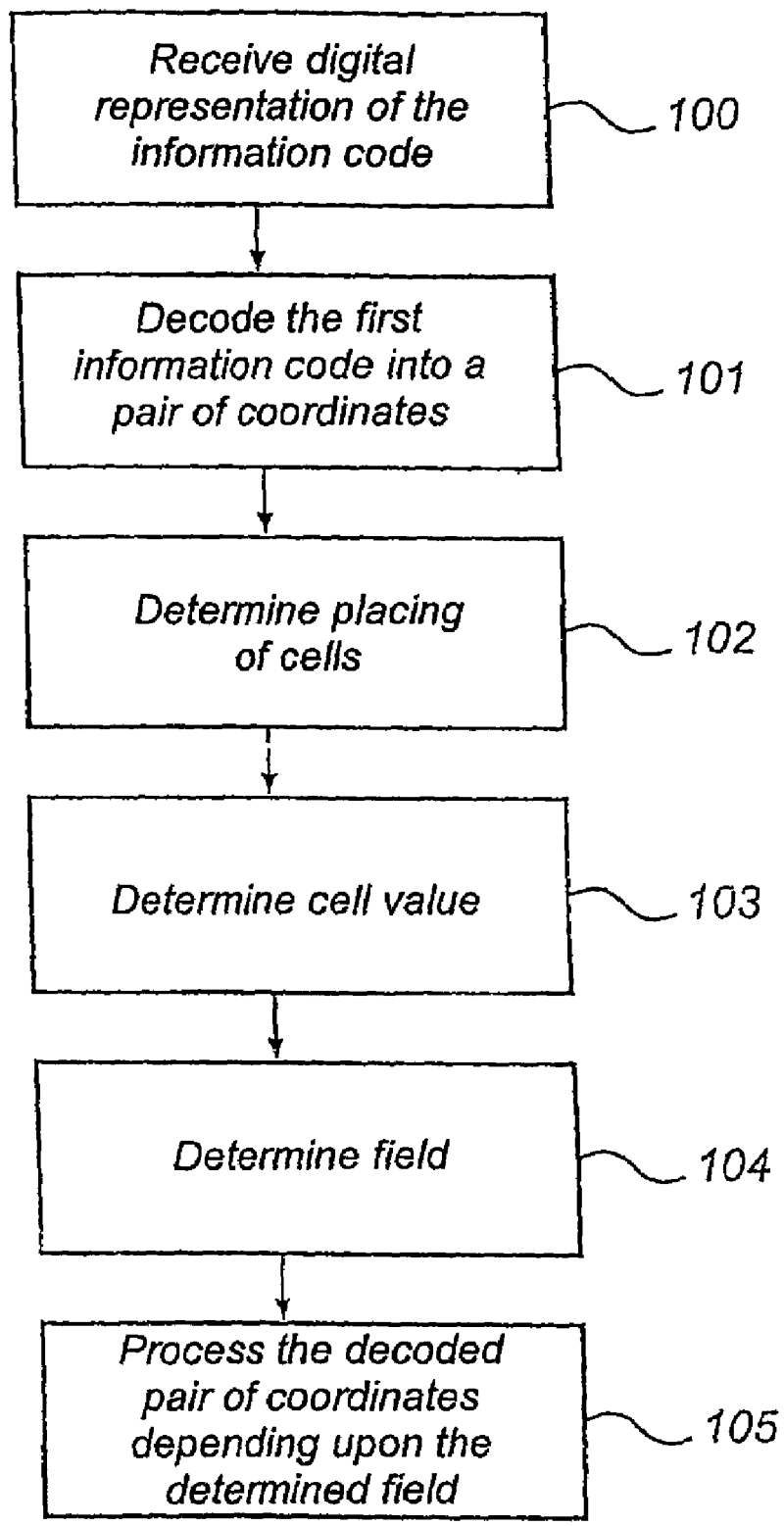
FIG. 10 is a flow chart that shows how an information code can be decoded.

An example of how the decoding of the information code described above can be carried out will now be described with reference to the flow chart in FIG. 10. The example is based on the second information code coding information by means of cell values and on the information code that covers the base comprising the second information code.

In a first step 100, the processor unit 96 in the user unit receives a digital representation of the information code that the sensor 94 recorded locally at the end of the user unit. The processor unit 96 thereafter decodes the first information code by identifying the marks in the digital representation, determining the virtual raster and the placing of the marks in relation to this and by calculating a pair of coordinates, step 101, on the basis of the placing of a predetermined number, for example 8*8, of the identified marks. The decoding of the first information code comprises error correction of the nominal positions 6 that do not have marks because they are in the second information code. A more detailed description of how the first information code can be decoded is to be found in WO 01/26032. A description of how the virtual raster can be determined is also to be found in WO 01/26034, WO 01/75783 and SE 0104088-0, which are all assigned to the same Applicant as the Applicant for the present application.

When the first information code has been decoded, the processor unit 96 can determine, in step 102, how the cells that are used for the decoding of the second information code are placed, since the placing of the cells is fixed in relation to the first information code. When the placing of the cells has been determined, the processor unit can, in addition, determine which nominal positions 6 in the second information code belong to the respective cells and it can thus determine which of these nominal positions have an associated mark and which do not have an associated mark and thereby determine the cell value, step 103, for example by means of a table that is stored in the memory of the user unit. Alternatively, the cell value can be given directly by an omitted mark coding a first bit value and a mark that is present coding a second bit value, the cell value being determined from the combination of bit values. Steps 102 and 103 thus correspond to a decoding of the second information code.

When the second information code has been decoded, the processor unit 96 can determine which field is coded by the second information code, step 104. It thereafter processes the pair of coordinates in a way that depends upon the detected field, step 105. If, for example, the cell value corresponds to the first field 61 in the e-mail form 60 in FIG. 6, the pair of coordinates decoded from the first information code is processed in the memory as a pair of coordinates belonging to a normal pen stroke on the surface. If instead, the processor unit 96 determines that the cell value corresponds to the second field 62, then the pair of coordinates will be stored for later ICR interpretation (ICR=Intelligent Character Recognition). If, finally, the processor unit determines that the cell value corresponds to the "send" box 63, the pair of coordinates will be processed as an instruction to send previously stored message information to an address that was ICR interpreted from the second field 62. The description of which fields are coded by the different cell values can be stored in the memory of the user unit.

The description above is based on decoding of the second information code when this codes information by means of cell values. If the second information code instead codes information by a predetermined pattern of omitted marks being displaced in various ways in relation to the first information code, then the processor unit 96 instead detects one or more nominal positions 2 in the first information code that do not have marks. With knowledge of the pattern for omission of marks, the processor unit 96 can thereafter calculate how the second information code is displaced relative to the first information code. More specifically, the processor unit 96 determines the positions of the omitted marks in relation to the origin and determines from these what value is coded by the second information code.

If the second information code instead codes information by the use of one of a plurality of predetermined patterns for the omission of marks, then the processor unit detects which nominal positions 2 do not have marks in the first information code. As a result, the processor unit 96 can, for example, determine whether the pattern of omitted dots is the one shown in FIG. 3a or 3b, or some other predetermined pattern and thereby determine what value is coded by the second information code.

The second information code can also code information on the basis of a combination of cell values and pattern displacement.

As described above, the idea of omitted dots can also be used to achieve copy protection for sheets of paper with information code of the type described above or a similar type.

The copy protection is based on the fact that marks that are normally included in the first information code are omitted in the way described above in association with the second information code, but that interference marks are associated with the nominal positions 6 for which the ordinary information marks are omitted. The interference marks are printed with different optical characteristics to those of the ordinary information marks, more specifically with such optical characteristics that are not visible to the decoding device that decodes the information coding pattern. In addition, the interference marks are placed in relation to the associated nominal position in a manner that is different to the manner in which the omitted mark would have been placed. The placing is preferably mirror-inverted, as then both the corresponding bit in the x-bit matrix and the corresponding bit in the y-matrix will be incorrect.

As the interference mark is invisible to the decoding device, this will not detect the interference mark, but will carry out the decoding as if the mark was omitted. As a result of redundancy in the information code, the decoding device can decode the information correctly, in spite of certain marks being missing. As the decoding device detects in which position the mark is missing, it also knows which bit in the corresponding column and row is to be error corrected. As the 8-bit long partial sequences in the main number sequence do not occur with one bit inverted, it is simple for the decoding device to determine which bit is correct in the position where the mark is missing.

If, for example, a sheet of paper, which is provided with this type of copy-protected information code, is copied, all the marks will have the same optical characteristics. All the marks will then be detected by the decoding device, but the interference marks will result in 8-bit sequences appearing during the decoding that are not found in the main number sequence.

The decoding device will be able to detect that the decoded bit matrices contain errors or that the decoded position is improbable in relation to the adjacent decoded positions, but will not be able to correct the error or errors since, unlike when a mark is omitted, it does not know which bits are to be corrected.

Figure 11A:
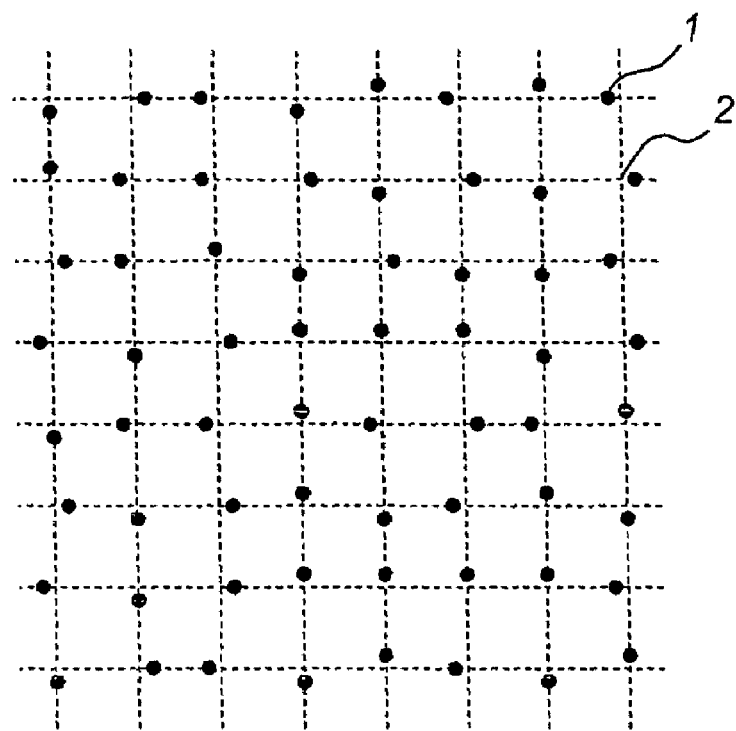
FIGS. 11a-11c show an information code without copy protection, the same information code with copy protection and the information code with copy protection after being copied.
Figure 11B:
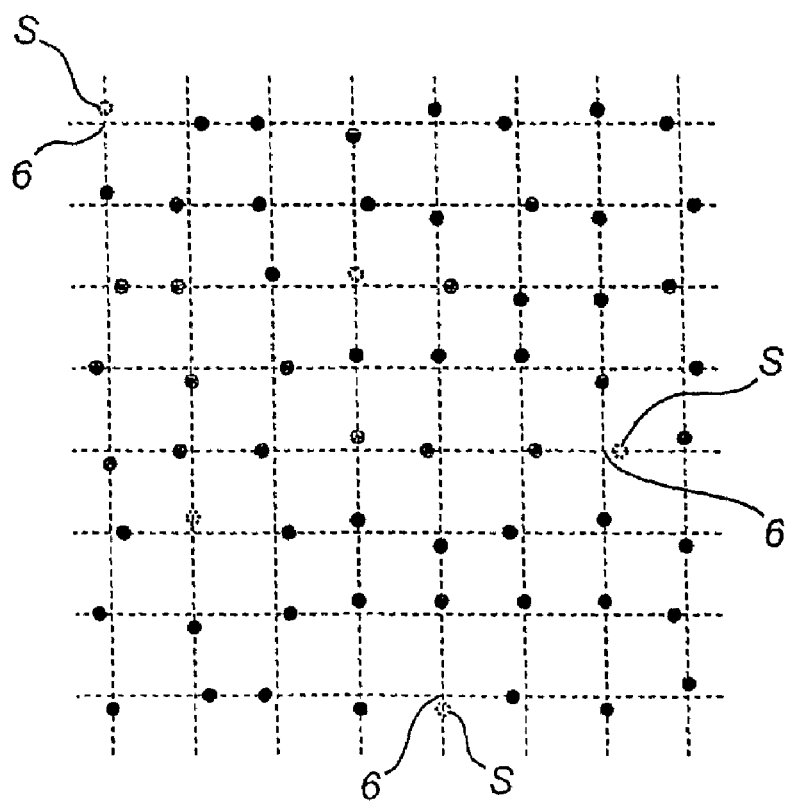
Figure 11C:
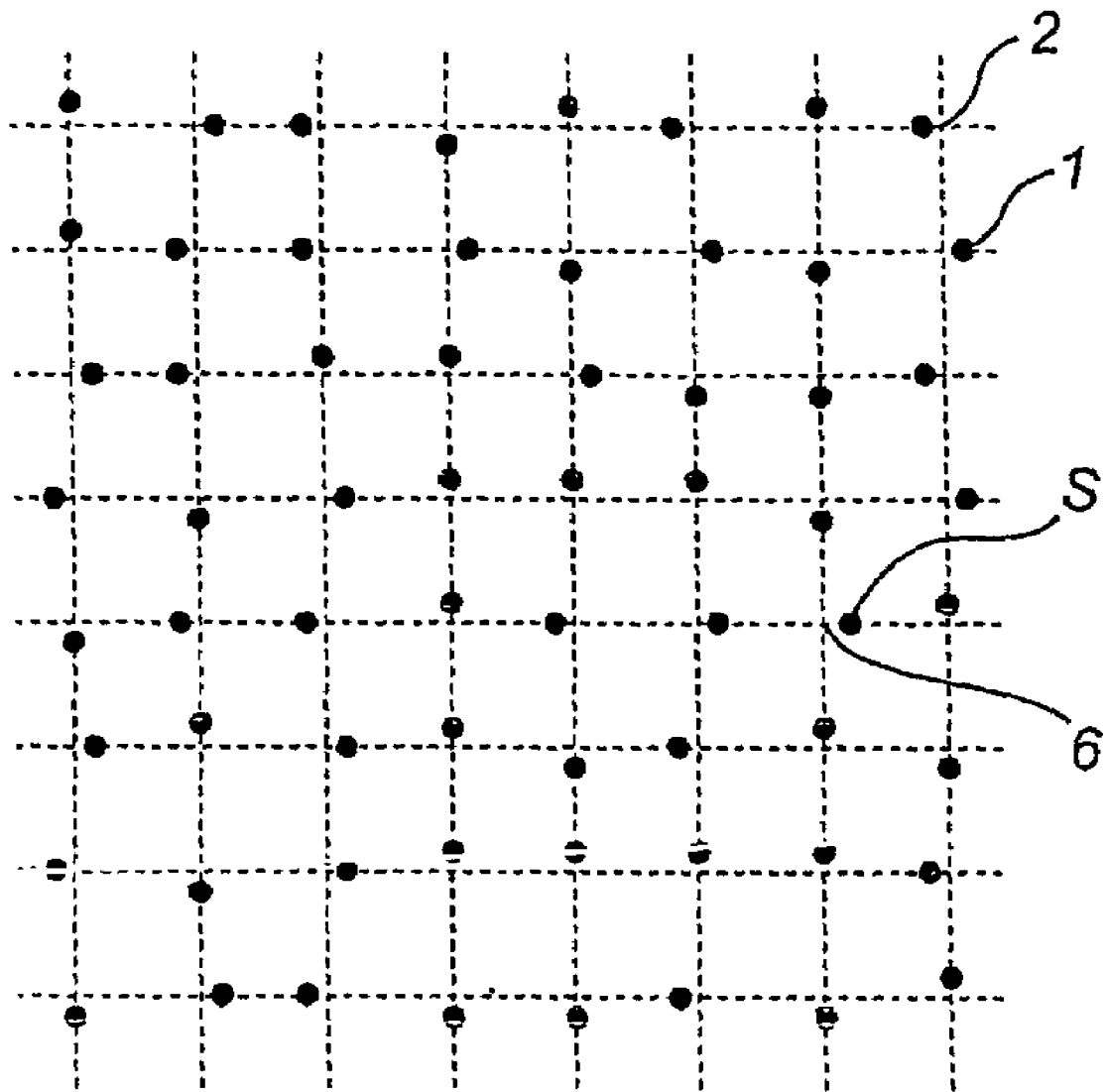

The copy protection is illustrated in FIGS. 11a-11c. FIG. 11a shows a set of 8*8 marks 1 that code a position. FIG. 11b shows the same set of 8*8 marks as in FIG. 11a, but with omitted marks for certain nominal positions. FIG. 11b also shows by dotted circles S how interference marks, which are invisible to a decoding device that can decode the information code, are placed. A comparison of FIG. 11a and FIG. 11b shows clearly that the placing of the interference marks is mirror-inverted in relation to the placing of the omitted marks. FIG. 11c illustrates how the 8*8 set in FIG. 11b appears after copying.

The normal marks can be printed with carbon-based black pigment and are detected by an infrared-sensitive sensor in a decoding device. The interference marks can be printed with a black pigment that does not contain carbon. Both carbon-based black pigment that absorbs infrared light and non-carbon-based black pigment that does not absorb infrared light are available on the market. The non-carbon-based pigment does not need to be black, but can instead appear black and can be made up of a combination of colours such as cyan, magenta and yellow during the printing process.

Examples of possible black carbon-based and noncarbon-based pigments are described in U.S. Pat. No. 5,145,518, U.S. Pat. No. 5,208,630, U.S. Pat. No. 5,225,900, U.S. Pat. No. 5,256,193, U.S. Pat. No. 5,271,764, U.S. Pat. No. 5,291,243 and U.S. Pat. No. 5,286,286.

In the example with a detector that is sensitive to infrared radiation, the essential factor concerning the copy protection is that when the interference marks are copied, they are changed from not absorbing infrared radiation to absorbing infrared radiation.

As another example, the copy protection can be realised by letting the ordinary marks be fluorescent in, for example, ultraviolet light, while the interference marks are not fluorescent in the same light. When they are copied, the non-fluorescent interference marks are changed to being fluorescent, so that all the marks have essentially the same optical characteristics.

A further variant could be to use a colour-sensitive decoding device and to let the ordinary marks be a first colour and the interference marks a second colour. Such copy protection can, however, be circumvented by using a colour copier.

It should be pointed out that it is of no importance whether the ordinary marks and the interference marks can be distinguished by the naked eye. What is important is that the marks on an original can be distinguished by a decoding device which is arranged to detect the information code, but that after copying they cannot be distinguished by the decoding device.

In addition, as has been pointed out above, the interference marks do not need to be invisible to the decoding device on the original. It is sufficient for the decoding device to be able to distinguish between the ordinary information marks and the interference marks.

The coding of the information code with built-in copy protection can be carried out using the same coding device and in essentially the same way as described above concerning the coding of the second information code. When printing the information code, however, the values in the fourth matrix are interpreted as follows:

0=normal mark displaced to the right
1=normal mark displaced upwards
2=normal mark displaced to the left
3=normal mark displaced downwards
4=interference mark displaced to the left
5=interference mark displaced downwards
6=interference mark displaced to the right
7=interference mark displaced upwards The actual printout of the information code can be carried out either in one pass, for example with an ink-jet printer where different marks can be printed out using different pigments, or in two passes, for example in a printing process with different pigments in the different passes.

The example above is based on marks being omitted for certain nominal positions in the first information code and on interference marks being inserted in these positions. Another possible solution is only to insert interference marks, without omitting marks in the first information code. In this case, however, the interference marks must be inserted closer together than in the case where marks are omitted, since one known incorrect mark can be corrected by the user unit. Several incorrect marks are, however, more difficult to correct, as there are several different possibilities for the correction.

The copy protection can be introduced over all or parts of an information code. If the information code contains the "send" box 63 in FIG. 6, it can be sufficient to introduce the copy protection in this, as it will then be impossible to send information using the "send" box.

It should also be pointed out that the copy protection can be combined with the second information code, with interference marks being inserted in the nominal positions that are included in the second information code and that do not have an associated mark.

ALTERNATIVE EMBODIMENTS

It has been described above how additional information can be coded in an information code by the omission of marks. The description has been given with reference to a special information code. The idea can, however, be applied to other types of information codes which redundantly code at least one first information element by means of a plurality of marks. Examples of such other information codes are to be found in, for instance, WO 00/73983, WO 99/50787 and U.S. Pat. No. 6,208,771.

It has also been described above how copy protection can be achieved by the insertion of an interference mark in an information code. The description has been given with reference to a special information code. The idea can, however, be applied to other information codes which code at least one first information element by means of a plurality of marks. Examples of such information codes are to be found in, for instance, WO 00/73983, WO 99/50787 and U.S. Pat. No. 6,208,771.

The information codes described above have a raster that creates a square grid. This is not necessary. The raster can, for example, be triangular or hexagonal, with the nominal positions consisting of points where the raster lines intersect.

In the description above, the value of each mark is coded by its placing in relation to a reference point. In other applicable information codes other parameters, such as the shape or colour or size of the mark, can be used to code the value of the mark.

The invention claimed is:

1. A product which is provided with a first information code which is arranged to redundantly code at least one first information element by means of a plurality of marks, the first information code comprising a plurality of first reference positions, each of said plurality of marks being associated with one of said first reference positions wherein the product is further provided with a second information code that comprises a plurality of second reference positions, which constitute a selection from said plurality of first reference positions, wherein at least one additional information element is coded by the second information code by at least one mark belonging to the first information code being intentionally omitted such that at least one of said plurality of second reference positions does not have an associated mark.

2. A product according to claim 1, wherein the first reference positions define a first virtual raster, which has first raster lines and in which the first reference positions consist of points at which the first raster lines intersect.

3. A product according to claim 1, wherein said at least one additional information element is coded by how said plurality of second reference positions are placed in relation to said plurality of first reference positions.

4. A product according to claim 1, wherein each second reference position in the second information code represents a first value if each second reference position has an associated mark and a second value if each second reference position does not have an associated mark.

5. A product according to claim 4, wherein the second reference positions form at least one cell with at least two second reference positions and wherein said at least one cell has a cell value that is determined by which values are represented by the second reference positions included in the cell.

6. A product according to claim 5, wherein said at least one cell has a fixed placing in relation to the first information code.

7. A product according to claim 5, wherein said at least one additional information element is coded by the cell value of said at least one cell.

8. A product according to claim 1, wherein said at least one additional information element represents a position.

9. A product according to claim 1, wherein said at least one first information element represents a position.

10. A product according to claim 1, wherein said at least one first information element is coded by means of variation of a parameter for the marks.

11. A product according to claim 10, wherein each mark in the first information code has a value that is determined by said parameter.

12. A product according to claim 10, wherein said parameter is one of the following: placing of the mark, shape of the mark, colour of the mark and size of the mark.

13. A method for coding, which method comprises redundantly coding at least one first information element in an information code by allocating a value to each of a plurality of marks, which value indicates how the mark is to be represented graphically when applying the information code on a product, and comprises coding at least one additional information element in the information code by allocating a value to at least one of said plurality of marks, which value indicates that the mark is to be omitted during said application of the information code on a product.

14. A computer readable storage medium stored thereon computer executable program for coding, the computer program when executed causes a processor to execute steps of:
   redundantly coding at least one first information element in an information code by allocating a value to each of a plurality of marks, which value indicates how the mark is to be represented graphically when applying the information code on a product; and
   coding at least one additional information element in the information code by allocating a value to at least one of said plurality of marks, which value indicates that the mark is to be omitted during said application of the information code on a product.

15. A device for coding an information code, comprising a processing unit which is arranged to redundantly code at least one first information element in an information code by allocating to each of a plurality of marks a value that indicates how the mark is to be represented graphically when applying the information code on a product, and to code at least one additional information element by allocating to at least one of said plurality of marks a value that indicates that the mark is to be omitted during said application of the information code on a product.

16. A method for decoding a first and a second information code, comprising:
   locating a plurality of marks in a digital representation of the first and the second information code;
   determining a plurality of first reference positions for the marks, each of said plurality of located marks being associated with one reference position;
   determining the values of the located marks for decoding at least one first information element coded by the first information code;
   identifying a plurality of second reference positions, which constitute a selection from said first reference positions; and
   decoding at least one additional information element coded by the second information code by identifying at least one of said second reference positions for which the associated mark belonging to the first information code has been intentionally omitted such that the second reference position does not have an associated mark.

17. A method according to claim 16, further comprising: decoding the at least one additional information element by identifying how said plurality of second reference positions is placed in relation to said plurality of first reference positions.

18. A method according to claim 16, wherein each second reference position in the second information code represents a first value if each second reference position has an associated mark and a second value if each second reference position does not have an associated mark.

19. A method according to claim 18, further comprising: identifying at least one cell including at least two second reference positions and decoding a cell value from the values represented by the second reference positions of the cell.

20. A method according to claim 19, further comprising: identifying the cell based on its fixed placing in relation to the first information code.

21. A method according to claim 19, further comprising: coding said at least one additional information element by the cell value of said at least one cell.

22. A computer readable storage medium stored thereon computer executable program for decoding a first and a second information code, the computer program when executed causes a processor to execute steps of:
locating a plurality of marks in a digital representation of the first and the second information code;
determining a plurality of first reference positions for the marks, each of said plurality of located marks being associated with one reference position;
determining the values of the located marks for decoding at least one first information element coded by the first information code;
identifying a plurality of second reference positions, which constitute a selection from said first reference positions; and
decoding at least one additional information element coded by the second information code by identifying at least one of said second reference positions for which the associated mark belonging to the first information code has been intentionally omitted such that the second reference position does not have an associated mark.

23. A device for decoding a first and a second information code, comprising a processing unit which is arranged to locate a plurality of marks in a digital representation of the first and the second information code, to determine a plurality of first reference positions for the marks, each of said plurality of located marks being associated with one reference position, to determine the values of the located marks for decoding at least one first information element coded by the first information code, to identify a plurality of second reference positions, which constitute a selection from said first reference positions, and to decode at least one additional, information element coded by the second information code by identifying at least one of said second reference positions for which the associated mark belonging to the first information code has been intentionally omitted such that the second reference position does not have an associated mark.

24. A product which is provided with an information code that codes at least one, first information element by means of a plurality of marks, the information code comprising a plurality of reference positions, wherein each of said plurality of marks is associated with one of said reference positions, wherein the product is further provided with at least one interference mark which has optical characteristics that differ from those of said plurality of marks, wherein each information element is coded by a set of a predetermined number of reference positions with associated marks.

25. A product according to claim 24, wherein said plurality of marks are arranged to be detected by a decoding device, using which said at least one interference mark is not detectable due to its optical characteristics.

26. A product according to claim 24, wherein said plurality of marks absorb infrared light and said at least one interference mark does not absorb infrared light.

27. A product according to claim 26, wherein said plurality of marks are applied with carbon-based black pigment and said at least one interference mark is applied with non-carbon-based black pigment.

28. A product according to claim 26, wherein said plurality of marks are applied with carbon-based black pigment and said at least one interference mark is applied with non-carbon based pigment that is made up of a combination of cyan, magenta, and yellow colours.

29. A product according to claim 24, wherein copy protection is achieved by means of said at least one interference mark.

30. A product according to claim 29, wherein copy protection is achieved by ensuring that when said at least one interference mark is copied, the interference mark changes its optical characteristic from being not absorbing infrared radiation to absorbing infrared radiation.

31. A product according to claim 24, wherein the product comprises at least one interference mark for each first information element that is coded by the information code.

32. A product according to claim 24, wherein each set has at least one reference position for which the associated mark is replaced by an interference mark.

33. A product according to claim 32, wherein each mark represents a value and each interference mark represents a different value to that of the mark replaced by corresponding interference mark.

34. A product according to claim 24, wherein said at least one interference mark is applied in the product in relation to associated reference position in a manner that is different than a manner in which an omitted mark would have been applied in said product.

35. A product according to claim 34, wherein said applying of at least one interference mark is mirror-inverted in relation to the applying of the omitted mark such that both corresponding bit in an x-bit matrix and corresponding bit in a y-bit matrix will be incorrect, wherein the x-bit matrix codes an x-coordinate and the y-bit matrix codes a y-coordinate for said at least one first information element.

36. A product according to claim 24, wherein said plurality of marks are fluorescent in a predetermined light and said at least one interference mark is non-fluorescent in said predetermined light.

37. A product according to claim 36, wherein copy protection is achieved by ensuring that when said at least one interference mark is copied, the interference mark changes its optical characteristic from being non-fluorescent to fluorescent.

38. A product according to claim 24, wherein the product is further provided with a second information code that comprises a plurality of second reference positions, wherein at least one of said plurality of second reference positions does not have an associated mark, with at least one interference mark being inserted in said at least one second reference position that does not have the associated mark.

39. A method for producing a product with an information code that codes at least one first information element by means of a plurality of marks, the information code comprising a plurality of reference positions, wherein each of said plurality of marks is associated with one of said reference positions, comprising:
applying said plurality of marks on the product;
applying at least one interference mark on the product, which interference mark has optical characteristics that differ from those of said plurality of marks; and
coding each information by a set of a predetermined number of reference positions with associated marks.

40. A method according to claim 39, further comprising: applying at least one interference mark in the product in relation to associated reference position in a manner that is different than a manner in which an omitted mark would have been applied in said product.

41. A method according to claim 39, further comprising: applying said plurality of marks on the product with carbon-based black pigment and applying said at least one interference mark on the product with non-carbon-based black pigment.

42. A method according to claim 39, further comprising: producing the product with a second information code that comprises a plurality of second reference positions, wherein at least one of said plurality of second reference positions does not have an associated mark, with at least one interference mark being inserted in said at least one second reference position that does not have the associated mark.

* * * * *